United States Patent
Lee et al.

(10) Patent No.: US 10,223,529 B2
(45) Date of Patent: Mar. 5, 2019

(54) INDEXING APPARATUS AND METHOD FOR SEARCH OF SECURITY MONITORING DATA

(71) Applicant: ELECTRONICS AND TELECOMMUNICATIONS RESEARCH INSTITUTE, Daejeon (KR)

(72) Inventors: Taek kyu Lee, Daejeon (KR); Geun Yong Kim, Daejeon (KR); Suk won Lee, Daejeon (KR); Kyu Cheol Jung, Daejeon (KR); SoonJwa Hong, Daejeon (KR); In seog Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 665 days.

(21) Appl. No.: 14/336,491

(22) Filed: Jul. 21, 2014

(65) Prior Publication Data
US 2015/0066947 A1 Mar. 5, 2015

(30) Foreign Application Priority Data

Aug. 30, 2013 (KR) .......................... 10-2013-0103956

(51) Int. Cl.
G06F 21/55 (2013.01)
H04L 29/06 (2006.01)

(52) U.S. Cl.
CPC ........ *G06F 21/552* (2013.01); *H04L 63/1425* (2013.01)

(58) Field of Classification Search
CPC .......................... G06F 21/552; H04L 63/1425
USPC ........................................................ 707/742
See application file for complete search history.

(56) References Cited

U.S. PATENT DOCUMENTS

| 6,507,849 B1 * | 1/2003 | Choudhary ....... G06F 17/30067 |
| 8,719,274 B1 * | 5/2014 | Yakovlev .............. G06F 9/4401 |
| | | 707/741 |
| 2004/0039808 A1 | 2/2004 | Ohara |

(Continued)

FOREIGN PATENT DOCUMENTS

| JP | 2012-215992 A | 11/2012 |
| KR | 10-0761234 B1 | 9/2007 |

(Continued)

OTHER PUBLICATIONS

Yong Jin Joo, "Design and Implementation of Moving Object Model for Nearest Neighbors Query Processing based on Multi-Level Global Fixed Gird," Journal of the Korean Society for GeoSpatial Information System, 2011.

*Primary Examiner* — Hicham Skhoun
(74) *Attorney, Agent, or Firm* — LRK Patent Law Firm

(57) ABSTRACT

An indexing apparatus and method for search of security monitoring data are provided. The indexing apparatus includes a data collection unit and a data index generation unit. The data collection unit collects data, that is, a basis of search of monitoring information, from a database in which security monitoring data has been stored. The data index generation unit generates file structure-based data in which indices have assigned to multiple search elements of the data collected by the data collection unit.

1 Claim, 4 Drawing Sheets

(56) References Cited

U.S. PATENT DOCUMENTS

2012/0304288 A1* 11/2012 Wright .................. G06F 21/552
  726/22
2013/0263116 A1* 10/2013 Haupt ................... G06F 9/5016
  718/1

FOREIGN PATENT DOCUMENTS

| KR | 10-0838799 B1 | 6/2008 |
| KR | 10-2010-0027836 A | 3/2010 |

* cited by examiner

ID-APPARATUS AND METHOD FOR SEARCH OF SECURITY MONITORING DATA

CROSS-REFERENCE TO RELATED APPLICATION

This application claims the benefit of Korean Patent Application No. 10-2013-0103956, filed on Aug. 30, 2013, which is hereby incorporated by reference herein in its entirety.

BACKGROUND OF THE INVENTION

1. Technical Field

The present disclosure relates generally to an indexing apparatus and method for the search of security monitoring data, and, more particularly, to an indexing apparatus and method that enable the efficient search of a massive amount of security monitoring data that is generated by the performance of network security monitoring.

2. Description of the Related Art

In general, in commercialized security monitoring systems, a massive amount of event, log and other information, generated by multiple heterogeneous pieces of security equipment, is stored and managed in a database management system (DBMS). However, due to the security monitoring task characteristics of collecting and searching a massive amount of security monitoring data in real time, it takes an excessively long time to use a DBMS because all data should be sequentially searched according to monitoring information data search conditions.

In other words, existing security monitoring data is stored and searched using a DBMS. However, this conventional method is problematic in that search performance is reduced in proportion to the accumulation of data due to the delay of search time attributable to the storage of a massive amount of data performed in real time and the extension of a data search range. Furthermore, when searches are performed using specific elements used in the search of security monitoring data, this method has its limitations in terms of performance for security monitoring systems because this method outputs matching resulting values obtained by simple comparison with a massive amount of DB content.

As a related preceding technology, Korean Patent Application Publication No. 10-2010-0027836 entitled "Method and System of Advanced Web Log Preprocess Algorithm for Rule Based Web IDS System" discloses a technology that provides the function of performing the efficient search of web log information and performs preprocessing in order to increase the efficiency of rule-based attack detection performed on a massive amount of log information generated by a web server, thereby improving the attack detection performance of a web IDS system.

The technology disclosed in Korean Patent Application Publication No. 10-2010-0027836 uses a method of preprocessing web logs configured in specific format in order to support the attack detection of the rule-based IDS system. In the preprocessing, a duplicated character string index table is established by dividing log files into field units, and an attack is detected using this table.

SUMMARY OF THE INVENTION

Accordingly, at least one embodiment of the present invention is intended to provide an apparatus and method that identify search elements used in security monitoring data and utilize a file structure-based data storage method, thereby efficiently improving the search speed of a massive amount of security monitoring data.

In accordance with an aspect of the present invention, there is provided an indexing apparatus for search of security monitoring data, including a data collection unit configured to collect data, that is, a basis of search of monitoring information, from a database in which security monitoring data has been stored; and a data index generation unit configured to generate file structure-based data in which indices have been assigned to multiple search elements of the data collected by the data collection unit.

The file structure-based data may be configured such that a plurality of files is organized in an inverted-tree hierarchical structure.

The plurality of files may include a data image file, a pointer list file, and an index list file.

The data image file may store event image files, each including a position field indicative of a location where the data, that is, the basis of the search of the monitoring information, is stored in file form, and an event information field where event information is stored; and the event information field may include source IP information, destination IP information, and pattern information.

A unit pointer list file of the pointer list file may include a pointer key field indicative of information about locations where the corresponding pointer list file is present, and a position field indicative of values mapped to the event information; the pointer key field and the position field may be linked to each other; and the pointer key field may be divided into a pointer key field of the source IP information, a pointer key field of the destination IP information, and a pointer key field of the pattern information.

A unit index list file of the index list file may include an index key field where index keys corresponding to the source IP information, the destination IP information and the pattern information, respectively, are stored; a first pointer key field including start values of first pointer key values of the pointer key field of the pointer list file for the source IP information, the destination IP information and the pattern information; and a pointer key count field including a final number of pointer key values identical to pointer key values of the pointer key fields of the pointer list file.

The indexing apparatus may further include a data comparison unit configured to determine whether there is omitted data by comparing the data collected by the data collection unit with the data of the database.

In accordance with another aspect of the present invention, there is provided an indexing method for search of security monitoring data, including collecting, by a data collection unit, data, that is, a basis of search of monitoring information, from a database in which security monitoring data has been stored; and generating, by a data index generation unit, file structure-based data in which indices have been assigned to multiple search elements of the data collected by the data collection unit.

The file structure-based data may be configured such that a plurality of files is organized in an inverted-tree hierarchical structure.

The plurality of files may include a data image file, a pointer list file, and an index list file.

The data image file may store event image files, each including a position field indicative of a location where the data, that is, the basis of the search of the monitoring information, is stored in file form, and an event information field where event information is stored; and the event information field may include source IP information, destination IP information, and pattern information.

A unit pointer list file of the pointer list file may include a pointer key field indicative of information about locations where the corresponding pointer list file is present, and a position field indicative of values mapped to the event information; the pointer key field and the position field may be linked to each other; and the pointer key field may be divided into a pointer key field of the source IP information, a pointer key field of the destination IP information, and a pointer key field of the pattern information.

A unit index list file of the index list file may include an index key field where index keys corresponding to the source IP information, the destination IP information and the pattern information, respectively, are stored; a first pointer key field including start values of first pointer key values of the pointer key field of the pointer list file for the source IP information, the destination IP information and the pattern information; and a pointer key count field including a final number of pointer key values identical to pointer key values of the pointer key fields of the pointer list file.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
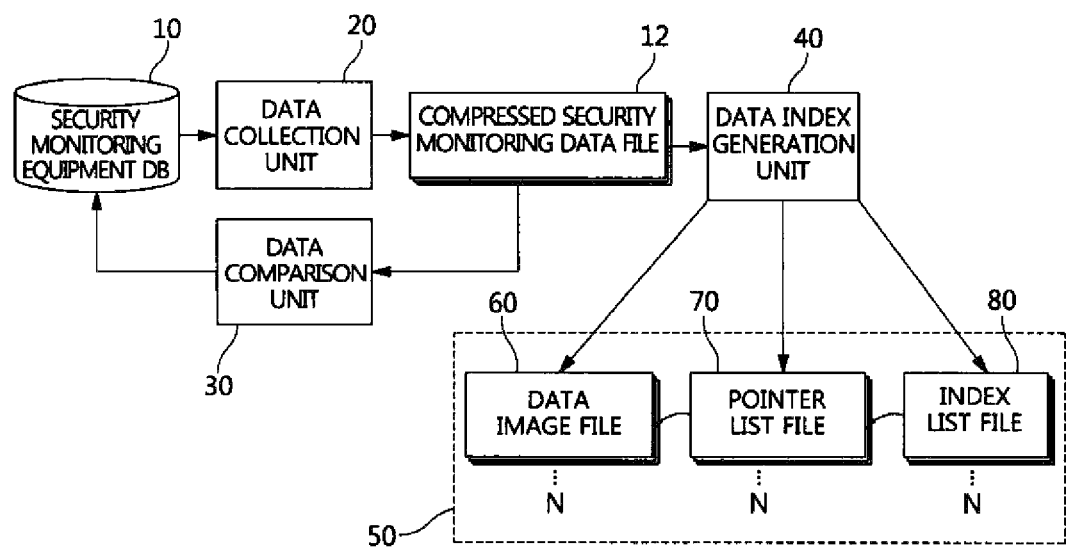
FIG. 1 is a diagram illustrating the configuration of an indexing apparatus for the search of security monitoring data according to an embodiment of the present invention.

An indexing apparatus and method for the search of security monitoring data according to embodiments of the present invention are described below with reference to the accompanying drawings. Prior to the following detailed description of the present invention, it should be noted that the terms and words used in the specification and the claims should not be construed as being limited to ordinary meanings or dictionary definitions. Meanwhile, the embodiments described in the specification and the configurations illustrated in the drawings are merely examples and do not exhaustively present the technical spirit of the present invention. Accordingly, it should be appreciated that there may be various equivalents and modifications that can replace the embodiments and the configurations at the time at which the present application is filed.

FIG. 1 is a diagram illustrating the configuration of an indexing apparatus for the search of security monitoring data according to an embodiment of the present invention.

The apparatus illustrated in FIG. 1 includes a security monitoring equipment database 10, a data collection unit 20, a data comparison unit 30, and a data index generation unit 40.

The security monitoring equipment database 10 stores security monitoring data that is generated by security monitoring equipment (not illustrated) in real time. The security monitoring equipment database 10 may be an example of database set forth in the claims of the present invention.

The data collection unit 20 collects data, that is, the basis of the search of monitoring information, from the security monitoring equipment database 10 for each time period. In this case, the data collection unit 20 compresses data collected for each time period into compressed file-type security monitoring data 12, and stores the compressed file-type security monitoring data 12 in the security monitoring equipment database 10.

In order to avoid the omission of data during the data collection of the data collection unit 20, the data comparison unit 30 determines whether there is omitted data by comparing the data (that is, the compressed file-form security monitoring data 12) collected by the data collection unit 20 with the data of the security monitoring equipment database 10. If there is omitted data, the data comparison unit 30 causes the data collection unit 20 to collect the omitted data. For example, the data comparison unit 30 transmits information about omitted data to the data collection unit 20, and the data collection unit 20 collects corresponding data based on the information about the omitted data.

The data index generation unit 40 generates file structure-based data 50 in which indices have been assigned to data collected by the data collection unit 20 with respect to a plurality of search elements. In greater detail, the data index generation unit 40 receives the compressed file-form security monitoring data 12 output from the data collection unit 20. The data index generation unit 40 generates file structure-based data 50 in which three types of files, that is, a data image file 60, a pointer list file 70, and an index list file 80, are organized in an inverted-tree hierarchical structure for each time period based on the received security monitoring data 12.

As described above, the present invention is configured to construct file structure-based data using the characteristic elements of security monitoring data by means of a fast indexing technique in order to perform the efficient search of a massive amount of security monitoring data that is generated in the performance of network security monitoring. The data stored in a file structure includes a record image file, a pointer list file, and an index list file. This data is configured to have an inverted-tree hierarchical structure, thereby enabling the fast search of security monitoring data.

Figure 2:
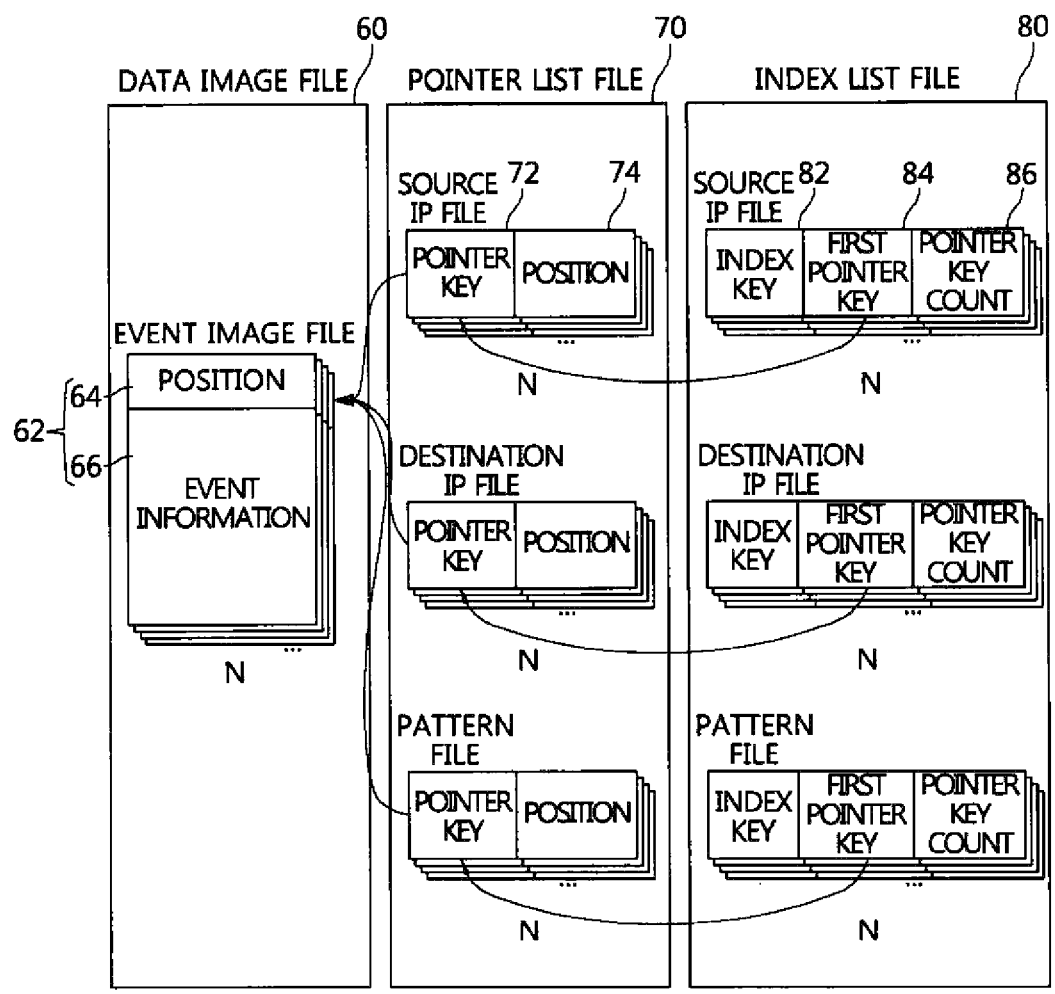
FIG. 2 is a diagram illustrating correlations in the file structure-based data illustrated in FIG. 1.

FIG. 2 is a diagram illustrating correlations in the file structure-based data illustrated in FIG. 1.

The data image file 60 may be viewed as a set of multiple event image files 62 stored in binary form. Each of the event image files 62 includes a position field 64 indicative of a location where data, that is, the basis of the search of monitoring information, is stored in file form, and an event information field 66 where event information is stored. In this case, the event information field 66 includes source IP information, destination IP information, and pattern information.

In the pointer list file 70, source IP files, destination IP files and pattern files are organized for common elements according to a linked list method.

In the pointer list file 70, files are arranged and stored in order of the source IP files, the destination IP files and the pattern files. A unit pointer list file of the pointer list file 70 includes a pointer key field 72 including information (that is, pointer keys) about the locations of a source IP file, a destination IP file and a pattern file; and a position field 74 indicative of values mapped to the event information 66 of the data image file 60 for the source IP file, the destination IP file and the pattern file. The unit pointer list file of the pointer list file 70 may be viewed as a set of a source IP file, a destination IP file and a pattern file. In other words, a unit pointer list file includes a pointer key field 72 and a position field 74. The pointer key field 72 includes a source IP pointer key, a destination IP pointer key, and a pattern pointer key, and each of the pointer keys may be viewed as being indicative of information about a location where the corresponding pointer list file is present. Furthermore, the position field 74 may be viewed as including values mapped to the event information of the data image file 60.

In the index list file 80, source IP files, destination IP files and pattern file are organized for common elements according to a linked list method. That is, in the index list file 80, the source IP files, the destination IP files and the pattern files are organized in a tree structure in order to increase search speed. In the index list file 80, the source IP files, the destination IP files and the pattern files include index key fields 82, first pointer key fields 84, and pointer key count fields 86 in the same manner.

In other words, a unit index list file of the index list file 80 includes an index key field 82 where a source IP value (which may be an index key), a destination IP value (which may be an index key), and a pattern value (which may be an index key) are stored for the source IP file, the destination IP file, and the pattern file, respectively; a first pointer key field 84 including start values of the first pointer key values of the pointer key field 72 of the pointer list file 70 for the source IP file, the destination IP file and the pattern file; and a pointer key count field 86 including the final number of pointer key values identical to the pointer key values of the pointer key field 72 of the pointer list file 70. The unit index list file of the index list file 80 may be viewed as a set of a source IP file, a destination IP file and a pattern file. The start and last values of desired information may be identified in the pointer list file 70 using the above information of the index list file 80.

Figure 3:
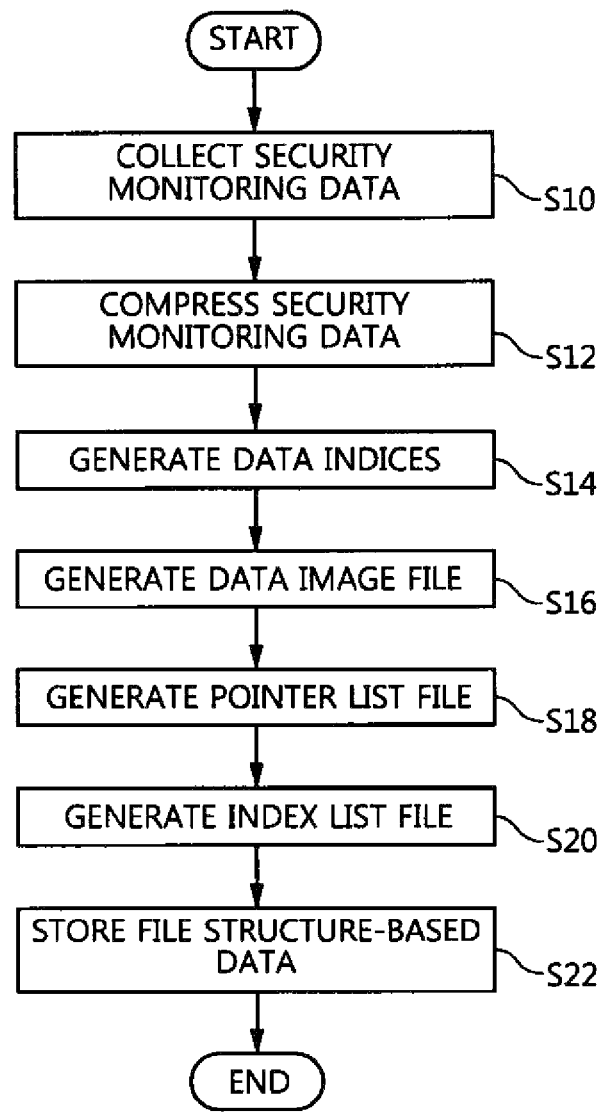
FIG. 3 is a flowchart of a method of indexing security monitoring data according to an embodiment of the present invention.

FIG. 3 is a flowchart of a method of indexing security monitoring data according to an embodiment of the present invention.

First, the data collection unit 20 collects data, that is, the basis of the search of monitoring information, from the security monitoring equipment database 10 for each time period at step S10.

The data collection unit 20 comprises the data collected for each period into compressed file-form security monitoring data 12 at step S12.

The compressed file-form security monitoring data 12 is input to the data index generation unit 40, and the data index generation unit 40 generates indices for a plurality of respective search elements of the compressed file-form security monitoring data 12 at step S14.

Thereafter, the data index generation unit 40 generates a data image file 60, a pointer list file 70 and an index list file 80 based on the received security monitoring data 12 for each time period at steps S16, S18 and S20, and organizes these three types of files in an inverted-tree hierarchical structure and stores them as file structure-based data 50 at step S22.

Figure 4:
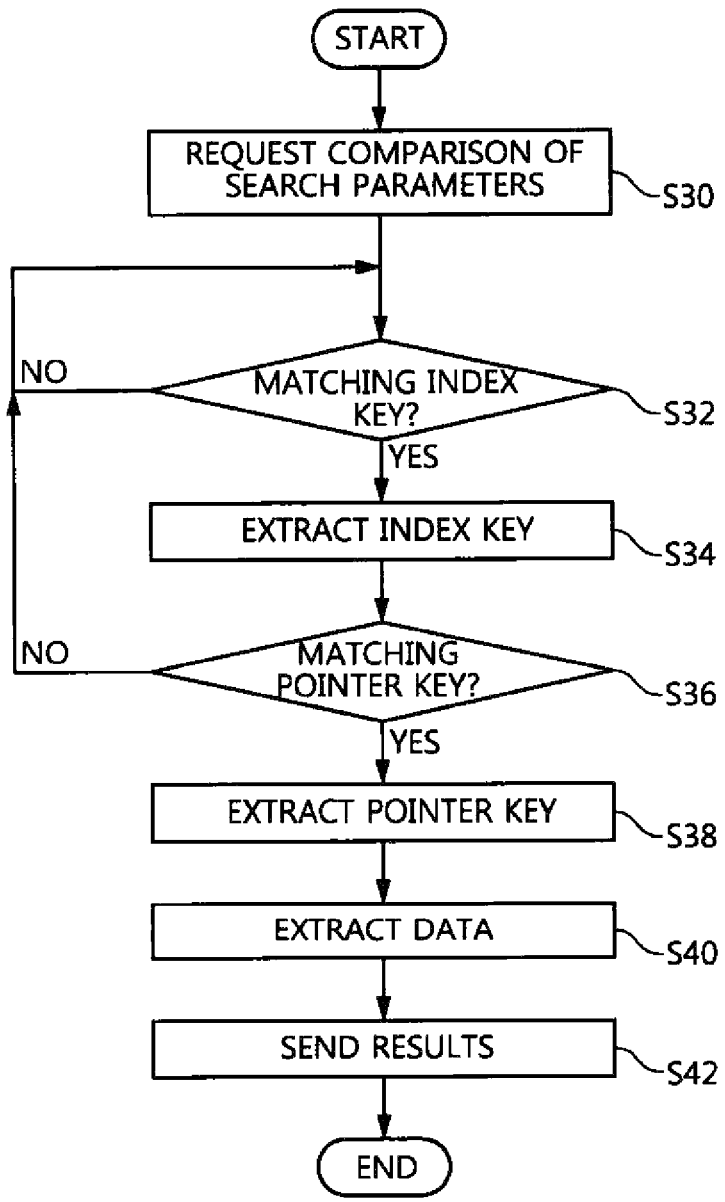
FIG. 4 is a flowchart illustrating a process of searching generated file structure-based data according to an embodiment of the present invention.

FIG. 4 is a flowchart illustrating a process of searching generated file structure-based data according to an embodiment of the present invention.

At least one embodiment of the present invention is chiefly directed to the generation of file structure-based data having an inverted-tree hierarchical structure in order to enable the efficient search of a massive amount of security monitoring information generated by various pieces of security equipment while enabling network security monitoring. Meanwhile, since the file structure-based data having an inverted-tree hierarchical structure generated according to the embodiment of the present invention can be sufficiently searched using common security monitoring equipment, there may be no need for a separate description of the security monitoring equipment. The file structure-based data 50 generated according to the embodiment of the present invention may be stored in security monitoring equipment, and may be stored in an external device outside security monitoring equipment and used in conjunction with the security monitoring equipment.

First, when stored information is searched, a user requests the comparison of search parameter values by inputting a source IP value, a destination IP value and a pattern value for the search at step S30. In this case, the pattern value may be viewed as a value indicative of a detection rule.

Thereafter, the security monitoring equipment searches whether there is a matching index key by comparing the received source IP value, destination IP value, and pattern value with the index list file 80 of the file structure-based data 50 at step S32. If, as a result of the search, a matching index key (that is, the same index key value) is present in an index key field 82, the corresponding index key is extracted at step S34.

Thereafter, the security monitoring equipment determines the pointer key value of a first pointer key field 84 linked to the corresponding index key field 82 and then searches whether there is a pointer key in the pointer list file 70 at step S36.

If there is no matching pointer key ("No" at step S36), the comparison of index key values is performed again. In contrast, if there is a matching pointer key, the corresponding pointer key is extracted at step S38 in the same manner as the index key is extracted.

Thereafter, the security monitoring equipment determines information inside the position field 74 linked to the corresponding pointer key field 72, and determines the position field 64 present in an event image file 62 inside the data image file 60, thereby extracting the corresponding security monitoring event information 66 at step S40.

Thereafter, the security monitoring equipment that has extracted the event information 66 transmits a resulting value to a user at step S42.

As described above, in the present invention, search speed can be improved by a file structure-based data storage method using specific parameters of security monitoring with respect to a massive amount of data generated by network security monitoring equipment. That is, file structure-based data is stored for key values used in the search of security monitoring data in advance, so that upon inputting search parameters, data can be immediately extracted by comparing only key values, thereby minimizing search speed.

In accordance with at least one embodiment of the present invention, the performance of the search of a massive amount of security monitoring data generated by multiple heterogeneous pieces of security equipment is improved.

Although it took five hours to search 30 GB of security monitoring data stored for a single day in a commercialized security monitoring system, it took three seconds to search the same data using the fast indexing technique of the present invention. This enables the analysis of correlations and the merging of information between multiple pieces of monitoring information of multiple pieces of security monitoring equipment, and can reduce the time it takes to perform security monitoring.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An indexing method for search of security monitoring data, comprising:
   collecting, by a data collection unit, data, that is, a basis of search of monitoring information, from a database in which security monitoring data has been stored; and
   generating, by a data index generation unit, file structure-based data in which indices have been assigned to multiple search elements of the data collected by the data collection unit,
   wherein the file structure-based data is configured such that a plurality of files is organized in an inverted-tree hierarchical structure, wherein the plurality of files includes a data image file, a pointer list file, and an index list file, and
   wherein:
   the data image file stores event image files, each including a position field indicative of a location where the data, that is, the basis of the search of the monitoring information, is stored in file form, and an event information field where event information is stored; and
   the event information field includes source IP information, destination IP information, and pattern information, and
   wherein a unit index list file of the index list file includes an index key field where index keys corresponding to the source IP information, the destination IP information and the pattern information, respectively, are stored; a first pointer key field including start values of first pointer key values of the pointer key field of the pointer list file for the source IP information, the destination IP information and the pattern information; and a pointer key count field including a final number of pointer key values identical to pointer key values of the pointer key fields of the pointer list file.

* * * * *